(12) United States Patent
Kuroda et al.

(10) Patent No.: US 10,890,777 B2
(45) Date of Patent: Jan. 12, 2021

(54) ELECTROMAGNETIC WAVE REFLECTING MEMBER

(71) Applicant: Dai Nippon Printing Co., Ltd., Tokyo (JP)

(72) Inventors: Takashi Kuroda, Moriya (JP); Satoru Hamada, Abiko (JP); Keiji Kashima, Tokorozawa (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 262 days.

(21) Appl. No.: 16/108,554

(22) Filed: Aug. 22, 2018

(65) Prior Publication Data

US 2018/0356644 A1 Dec. 13, 2018

Related U.S. Application Data

(62) Division of application No. 12/712,352, filed on Feb. 25, 2010, now abandoned.

(30) Foreign Application Priority Data

Feb. 26, 2009 (JP) .................................. 2009-043751
Jun. 3, 2009 (JP) .................................. 2009-134135

(51) Int. Cl.
*G02B 5/30* (2006.01)
*G02B 27/28* (2006.01)
(Continued)

(52) U.S. Cl.
CPC ............. *G02B 27/288* (2013.01); *G02B 5/26* (2013.01); *G02B 5/286* (2013.01); *G02B 5/3083* (2013.01)

(58) Field of Classification Search
CPC ...... G02B 5/26; G02B 5/3083; G02B 27/286; G02B 27/288
(Continued)

(56) References Cited

U.S. PATENT DOCUMENTS

| 4,907,846 A | 3/1990 | Tustison et al. |
| 4,991,924 A | 2/1991 | Shankar et al. |

(Continued)

FOREIGN PATENT DOCUMENTS

| JP | 02-059703 A1 | 2/1990 |
| JP | 02-089007 A1 | 3/1990 |

(Continued)

OTHER PUBLICATIONS

Japanese Office Action dated May 24, 2013 (with English translation).

(Continued)

*Primary Examiner* — Ricky D Shafer
(74) *Attorney, Agent, or Firm* — Burr & Brown, PLLC

(57) ABSTRACT

Disclosed is a selectively reflective member which can uniformly reflect only a desired wavelength with high efficiency even in a large area and, at the same time, is highly cost effective. Specifically, there is provided an electromagnetic wave reflecting member that reflects electromagnetic waves with a specific wavelength, the electromagnetic wave reflecting member comprising a first selectively reflective layer that reflects only a clockwise or counterclockwise circularly polarized light component with wavelength λ in incident electromagnetic waves, a phase difference layer, and a second selectively reflective layer that reflects only a clockwise or counterclockwise circularly polarized light component with wavelength λ, provided in that order, the phase difference layer having a retardation satisfying the following equation:

$$Re=\{(2n+1)/2\pm 0.2\}\times \lambda$$

wherein Re represents average retardation; λ represents wavelength; and n is an integer of 1 or more.

1 Claim, 7 Drawing Sheets

(51) Int. Cl.
*G02B 5/26* (2006.01)
*G02B 5/28* (2006.01)

(58) Field of Classification Search
USPC ............ 359/489.07, 489.12, 489.13, 489.15
See application file for complete search history.

(56) References Cited

U.S. PATENT DOCUMENTS

| | | | |
|---|---|---|---|
| 6,800,337 | B1 | 10/2004 | Siemensmeyer et al. |
| 7,170,680 | B2 | 1/2007 | Macmaster |
| 7,405,780 | B2 * | 7/2008 | Kashima ............ G02F 1/13362 349/98 |
| 9,869,805 | B2 * | 1/2018 | Tanaka ................... G02B 5/282 |
| 2005/0174641 | A1 | 8/2005 | Greenberg et al. |
| 2006/0209238 | A1 | 9/2006 | Shiraogawa et al. |
| 2007/0109673 | A1 | 5/2007 | Padiyath et al. |
| 2007/0159576 | A1 | 7/2007 | Tanabe et al. |

FOREIGN PATENT DOCUMENTS

| | | |
|---|---|---|
| JP | 04-281403 A1 | 10/1992 |
| JP | 2000-162419 A | 6/2000 |
| JP | 2000-313757 A1 | 11/2000 |
| JP | 2001-519317 A1 | 10/2001 |
| JP | 2002-090535 A | 3/2002 |
| JP | 2003-149425 A | 5/2003 |
| JP | 2004-233604 A1 | 8/2004 |
| JP | 2004-333671 A1 | 11/2004 |
| JP | 2007-237535 A1 | 9/2007 |

OTHER PUBLICATIONS

Japanese Office Action (With English Translation), Japanese Application No. 2014-001187, dated Sep. 19, 2014 (5 pages).

* cited by examiner

US 10,890,777 B2

ELECTROMAGNETIC WAVE REFLECTING MEMBER

CROSS-REFERENCE TO RELATED APPLICATION

This application is a Divisional of U.S. application Ser. No. 12/712,352, filed Feb. 25, 2010, the entirety of which is incorporated herein by reference, and claims the benefit under 35 USC § 119(a)-(d) of Japanese Patent Application No. 2009-043751 filed on Feb. 26, 2009 and Japanese Patent Application No. 2009-134135 filed on Jun. 3, 2009.

BACKGROUND OF THE INVENTION

Field of the Invention

The present invention relates to an electromagnetic wave reflecting member and more specifically to an electromagnetic wave reflecting member that can efficiently and uniformly reflect electromagnetic waves with a specific wavelength falling within a visible to far-infrared light wavelength range.

Background Art

Selectively reflective members using cholesteric liquid crystals are known as a member that can selectively reflect a light component with a desired wavelength in a visible light to heat radiation wavelength range. These selectively reflective members can selectively reflect only light (electromagnetic waves) with a desired wavelength and thus are expected to be used, for example, as heat radiation reflecting films or light transparent and heat insulating films that are transparent to visible light and reflect only a heat radiation. In the cholesteric liquid crystal which can realize selective reflection, light or heat radiations with desired wavelengths can be reflected by properly selecting a spiral pitch and the average refractive index of the liquid crystal. Since, however, the cholesteric liquid crystal can reflect only a clockwise or counterclockwise circularly polarized light component with a specific reflection wavelength, the reflectance is about 50%.

Various proposals have been made to improve the reflection efficiency of the selectively reflective member. For example, Japanese Patent Application Laid-Open No. 281403/1992 and Japanese Translation of PCT Publication No. 519317/2001 propose a technique where, as shown in FIG. 13a, two cholestric liquid crystal films 11, 12 different from each other in a spiral direction are superimposed on top of each other to reflect both a clockwise circularly polarized light component and a counterclockwise circularly polarized light component in incident light (electromagnetic waves). Further, a laminate has been proposed in which, as shown in FIG. 13b, a λ/2 plate 14 is inserted into between two cholesteric liquid crystal films 13 having an identical spiral direction to change the direction of polarized light by the λ/2 plate 14, whereby both the circularly polarized light components can be reflected to highly efficiently reflect light (heat radiation) with a desired wavelength. The disclosures of these publications are incorporated herein by reference.

Cholesteric liquid crystals having a counterclockwise spiral pitch, however, hardly exist in nature, and thus should be chemically synthesized and thus are highly expensive. Accordingly, this leads to an increase in cost of selectively reflective members comprising a cholesteric liquid crystal film, which reflects a counterclockwise circularly polarized light component, and a cholesteric liquid crystal film, which reflects a clockwise circularly polarized light component, stacked on top of each other. For this reason, the production of the above laminates on a commercial scale at low cost is difficult. On the other hand, a selectively reflective member having a structure comprising a pair of cholesteric liquid crystal films stacked on top of each other through a λ/2 plate as shown in FIG. 13b is advantageous in that cholesteric liquid crystal films having a clockwise spiral structure which reflects a clockwise circularly polarized light component can be used as both the cholesteric liquid crystal films.

On the other hand, a phase difference film having a retardation of λ/2 is generally used as a λ/2 plate used in the selectively reflective member as shown in FIG. 13b. For example, stretched polymer films and films formed by casting a polymer solution are generally used as the phase difference film.

When the selectively reflective member is used as a large-area member such as window glass for buildings or automotive glass, in order to obtain uniform in-plane reflecting properties, the whole area of the phase difference film should have a uniform phase difference (retardation). Phase difference films for use, for example, in large-screen liquid crystal display devices are also required to have uniform in-plane retardation. Phase difference films formed by casting, such as triacetylcellulose (TAC) films are generally used as the phase difference film having a uniform in-plane retardation distribution.

The casting method, that is, the method which comprises coating a solution of a cellulose ester dissolved in an organic solvent onto a support to form a coating, removing the solvent from the coating to dry the coating, and separating the dried coating from the support, however, requires large equipment and special techniques. Accordingly, as compared with general-purpose stretched films formed by melt extrusion, films formed by casting is still expensive. On the other hand, for the stretched films formed by melt extrusion, difficulties are experienced in regulating in-plane birefringence and film thickness that determine retardation values. In order to overcome the problem, Japanese Patent Application Laid-Open No. 59703/1990 and Japanese Patent Application Laid-Open No. 89007/1990 propose the application of a special stretching method which comprises forming a phase difference films by melt extruding a thermoplastic polymer to form a film and stretching the film. The claimed advantage of this technique is to reduce uneven in-plane retardation. Further, Japanese Patent Application Laid-Open No. 313757/2000 and Japanese Patent Application Laid-Open No. 233604/2004 propose the application of a special process in a period from a melt extrusion step to a stretching step. The claimed advantage of this technique is to bring the in-plane distribution to several nanometers or less. The disclosures of these publications are incorporated herein by reference. Thus, in order to use the stretched polymer film as the phase difference film, the in-plane distribution of the retardation should be brought to several nanometers or less. Accordingly, general-purpose stretched polymer films having an in-plane retardation distribution of about ±50 nm, for example, polyethylene terephthalate films as commercially available biaxially stretched films, cannot be used as the phase difference film.

SUMMARY OF THE INVENTION

The present inventors have now found that, in a selectively reflective member having a structure comprising a pair of cholesteric liquid crystal films stacked on top of each other through a phase difference film, even when a general-purpose stretched film such as a polyethylene terephthalate film is used as the phase difference film, the selectively reflective member can uniformly reflect only a light component with a desired wavelength with high efficiency even in a large area and, at the same time, is highly cost effective if the phase difference film satisfies specific conditions. The present invention has been made based on such finding.

Accordingly, an object of the present invention is to provide an electromagnetic wave reflecting member, which can uniformly reflect only a light component with a desired wavelength with high efficiency even in a large area, using a very inexpensive material.

Thus, according to the present invention, there is provided an electromagnetic wave reflecting member that reflects electromagnetic waves with a specific wavelength and comprises a first selectively reflective layer that reflects only a clockwise or counterclockwise circularly polarized light component with wavelength λ in incident electromagnetic waves, a phase difference layer, and a second selectively reflective layer that reflects only a clockwise or counterclockwise circularly polarized light component with wavelength λ, provided in that order, the phase difference layer having an average retardation satisfying the following equation:

$$Re=\{(2n+1)/2\pm 0.2\}\times \lambda$$

wherein Re represents retardation; λ represents wavelength; and n is an integer of 1 or more.

In the electromagnetic wave reflecting member according to this aspect of the invention, preferably, both the first and second selectively reflective layers each reflect only a clockwise circularly polarized light component with wavelength λ.

In the electromagnetic wave reflecting member according to this aspect of the invention, preferably, the reflection wavelength λ is in the range of 400 nm to 20 μm.

In the electromagnetic wave reflecting member according to this aspect of the invention, preferably, the phase difference layer is formed of a stretched polymer film.

In the electromagnetic wave reflecting member according to this aspect of the invention, preferably, the in-plane distribution of the retardation of the polymer film is ±25 nm or more.

In the electromagnetic wave reflecting member according to this aspect of the invention, preferably, the in-plane distribution of the retardation of the polymer film is ±10% or less of the average retardation of the whole plane.

In the electromagnetic wave reflecting member according to this aspect of the invention, preferably, the polymer film is a polyethylene terephthalate film.

In the electromagnetic wave reflecting member according to this aspect of the invention, preferably, the selectively reflective layer comprises a rod-like compound having a cholesteric structure.

In the electromagnetic wave reflecting member according to this aspect of the invention, preferably, the selectively reflective layer comprises an immobilized chiral nematic liquid crystal.

In the electromagnetic wave reflecting member according to this aspect of the invention, preferably, the reflection wavelength λ is not less than 750 nm.

According to another aspect of the present invention, there is provided a heat reflecting glass comprising an electromagnetic wave reflecting member.

According to the present invention, the phase difference layer held between the first and second selectively reflective layers that reflect only a clockwise or counterclockwise polarized light component with wavelength λ in electromagnetic waves has an average retardation satisfying the following relationship: $Re=\{(2n+1)/2\pm 0.2\}\times \lambda$. Accordingly, for example, when a selectively reflective layer that selectively reflects near-infrared light with a wavelength of 1200 nm is used, the average retardation Re of the phase difference layer is 1800 nm at n=1, 3000 nm at n=2, 4200 nm at n=3, and 5400 nm at n=4. Therefore, even when a commercially available phase difference film having an in-plane retardation distribution of about 4200±50 nm as such is used, the deviation from the retardation value necessary for converting clockwise or counterclockwise circularly polarized light to counterclockwise or clockwise circularly polarized light is about 8% at the maximum. Therefore, the deviation hardly affects the reflection efficiency. Consequently, an electromagnetic wave reflecting member can be realized that can uniformly reflect only a desired wavelength with high efficiency even in a large area and, at the same time, is highly cost effective.

DETAILED DESCRIPTION OF THE INVENTION

Figure 1:
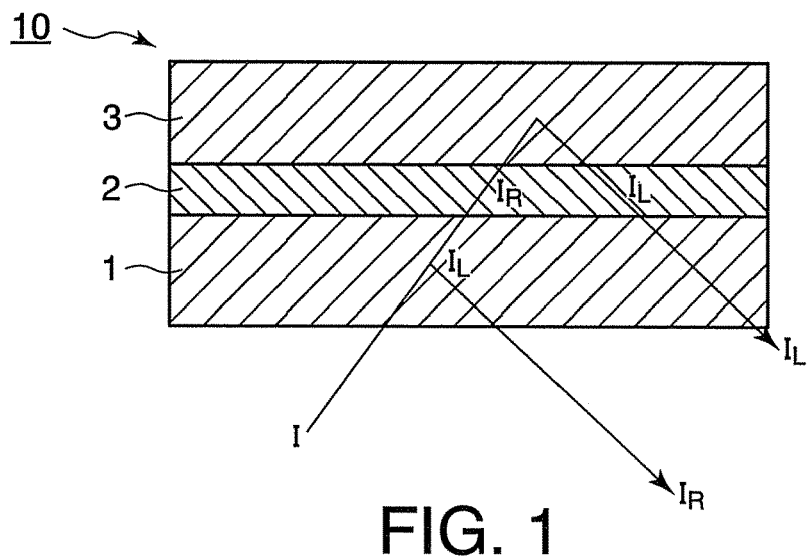
FIG. 1 is a schematic cross-sectional view showing one embodiment of the electromagnetic wave reflecting member according to the present invention.

As shown in FIG. 1, the electromagnetic wave reflecting member according to the present invention comprises a first selectively reflective layer 1 that reflects only a clockwise or counterclockwise circularly polarized light component with wavelength λ in incident electromagnetic waves, a phase difference layer 2, and a second selectively reflective layer 3 that reflects only a clockwise or counterclockwise circularly polarized light component with wavelength λ, provided in that order. The function of the electromagnetic wave reflecting member according to the present invention will be described with reference to FIG. 1 by taking as an example the case where the first and second selectively reflective layers reflect only a clockwise circularly polarized light component.

When an electromagnetic wave I is incident on the first selectively reflective layer 1, only a clockwise circularly polarized light component $I_R$ is reflected while a counterclockwise circularly polarized light component $I_L$ is passed through the first selectively reflective layer 1. When the passed counterclockwise circularly polarized light component $I_L$ is passed through the phase difference layer 2, the direction of the polarized light is reversed, so that the counterclockwise circularly polarized light component $I_L$ is converted to the clockwise circularly polarized light component $I_R$. The clockwise circularly polarized light component $I_R$ passed through the phase difference layer 2 is reflected at the second selectively reflective layer 3 and enters the phase difference layer 2. In this case, in the clockwise circularly polarized light component $I_R$, the direction of the polarized light is again reversed, and the clockwise circularly polarized light component $I_R$ is converted to the counterclockwise circularly polarized light component $I_L$. Since the counterclockwise circularly polarized light component $I_L$ can be passed through the selectively reflectively layer 1, the counterclockwise circularly polarized light component $I_L$ converted by the phase difference layer 2 as such is passed through the selectively reflective layer 1 and, together with the clockwise circularly polarized light component $I_R$, is travelled toward the incident side. As a result, a reflectance of more than 50% can be realized. As described below, the present invention is characterized in that an electromagnetic wave reflecting member having uniform and highly efficient in-plane reflecting properties is realized by using a phase difference layer satisfying Re={(2n+1)/2±0.2}×λ. In general, the phase difference film used as a λ/2 plate or a λ/4 plate is a polymer film formed of a cellulose derivative, a cycloolefin resin or the like and is widely used on a commercial scale. In these phase difference films, the in-plane retardation distribution is so small that the retardation is uniform over the whole area of the film. For example, TAC films which are widely used as the phase difference film for optical elements has an in-plane retardation distribution of about 1.5 nm. On the other hand, for a polymer stretched film formed by melt extruding a general-purpose resin, difficulties are experienced in providing uniform thickness and birefringence over the whole area of the film. Accordingly, the in-plane retardation distribution of these polymer stretched films is approximately several tens of nanometers. When the phase difference film has a retardation Re value of not less than 3λ/2 nm that satisfies the relationship represented by formula (1), for example, when the phase difference film has a retardation Re value of 1800 nm at a reflection wavelength λ of 1200 nm, even in the case of a polymer stretched film having an in-plane retardation distribution of, for example, about 50 nm, the influence of the reflectance on the maximum reflection wavelength, that is, the value of 1−sin²(π·Re/λ)×100, is low and about 1−sin²(π·1850/1200)×100=1.7%. Consequently, uniform and highly efficient in-plane reflecting properties can be realized.

Each of the elements constituting the electromagnetic wave reflecting member according to the present invention will be described.

<Phase Difference Layer>

The phase difference layer used in the present invention should satisfy an average retardation requirement represented by equation (1):

$$Re=\{(2n+1)/2\pm0.2\}\times\lambda \quad (1)$$

In equation (1), Re represents retardation; λ represents wavelength; and n is an integer of 1 or more. In the present specification, the retardation of the phase difference layer is defined by equation (2):

$$Re=(n_x-n_y)\times d \quad (2)$$

wherein $n_x$ represents a refractive index in a direction (a slow axis direction), in the phase difference layer, that provides the highest refractive index; $n_y$ represents a refractive index in a direction (a fast axis direction) perpendicular to the slow axis direction; and d represents the thickness of the phase difference layer. The average retardation is defined as a value obtained by measuring retardation at 20 points at equal intervals (10 mm) for any 200-mm width of the phase difference layer and averaging the measured retardation values. The retardation can be measured (measuring angle: 0 degree), for example, with KOBRA-WX100/IR manufactured by Oji Scientific Instruments.

Figure 5:
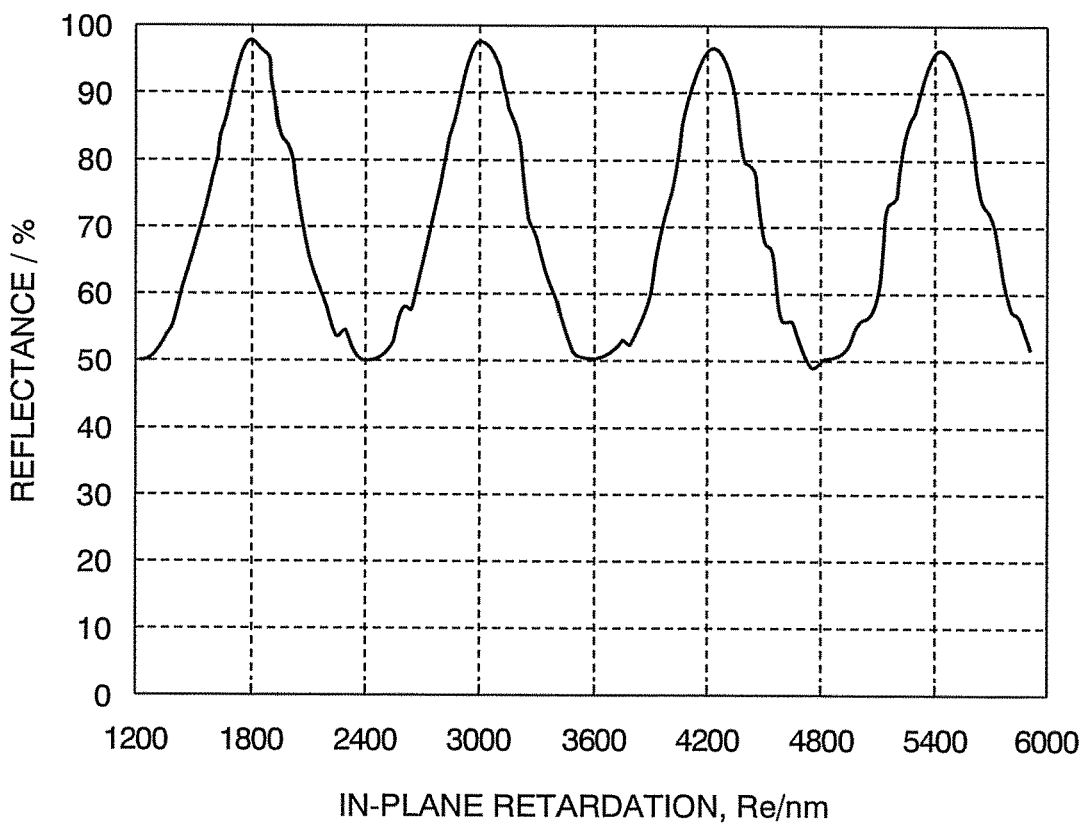
FIG. 5 is a graph showing the relationship between an in-plane phase difference Re and reflectance of a phase difference film (PET film)

When the average retardation of the phase difference layer satisfies equation (1), as shown in FIG. 5, the reflectance of the electromagnetic wave reflecting member can be brought to not less than 60%. FIG. 5 shows the relationship between the in-plane phase difference Re and the reflectance in the phase difference film (PET film) when λ=1200 nm and n=1, 2, 3, and 4. As can be seen from FIG. 5, the reflectance is not less than 60% when the retardation is in the range of {(2n+1)/2−0.2} λ to {(2n+1)/2+0.2} λ.

In the present invention, a plurality of phase difference films used in the prior art, for example, λ/2 plates or λ/4 plates, are superimposed on top of each other to constitute a phase difference layer. In this case, whole phase difference layer should satisfy equation (1). That is, at least the average retardation of the phase difference layer is approximately 1.3 to 1.7 times a desired selected reflection wavelength λ. For example, when the wavelength λ of the light component reflected at the selectively reflective layer is 1200 nm, the phase difference film has at least an average retardation in the range of 1560 nm to 2040 nm as determined by equation (1). When the phase difference layer has the average retardation, the whole electromagnetic wave reflecting member can realize uniform and highly efficient reflecting properties even in the case where the in-plane retardation distribution of the phase difference layer is several tens of nanometers. That is, the present invention is characterized in that a general-purpose polymer stretched film which has a large in-plane retardation distribution and a large average retardation and has not hitherto been used as a phase difference film is applied as a phase difference layer to an electromagnetic wave reflecting member so as to satisfy equation (1). In the present specification, the in-plane retardation distribution is defined as a value obtained by measuring retardation at 20 points at equal intervals (10 mm) for any 200-mm width of the film and determining the difference between the maximum retardation and the minimum retardation. The retardation can be measured (measuring angle: 0 degree), for example, with KOBRA-WX100/IR manufactured by Oji Scientific Instruments.

The reason why, as described above, the electromagnetic wave reflecting member has uniform and highly efficient reflecting properties as a whole even when a polymer stretched film having an in-plane retardation distribution of approximately several tens of nanometers is used as the phase difference layer, will be described by taking an example.

Figure 6:
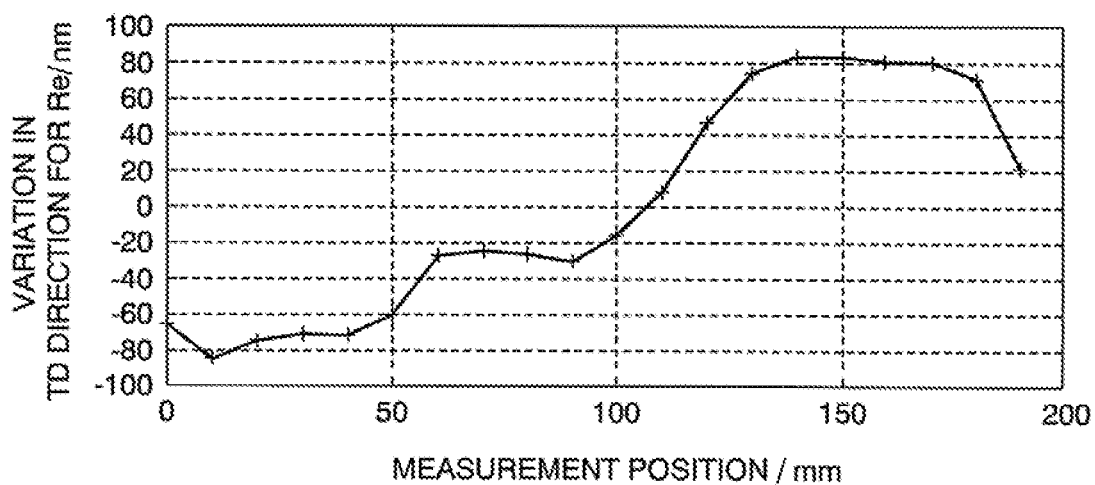
FIG. 6 is a graph showing the results of measurement of a variation in in-plane retardation (transverse direction (TD)) of the PET film used in Example 1.
Figure 7:
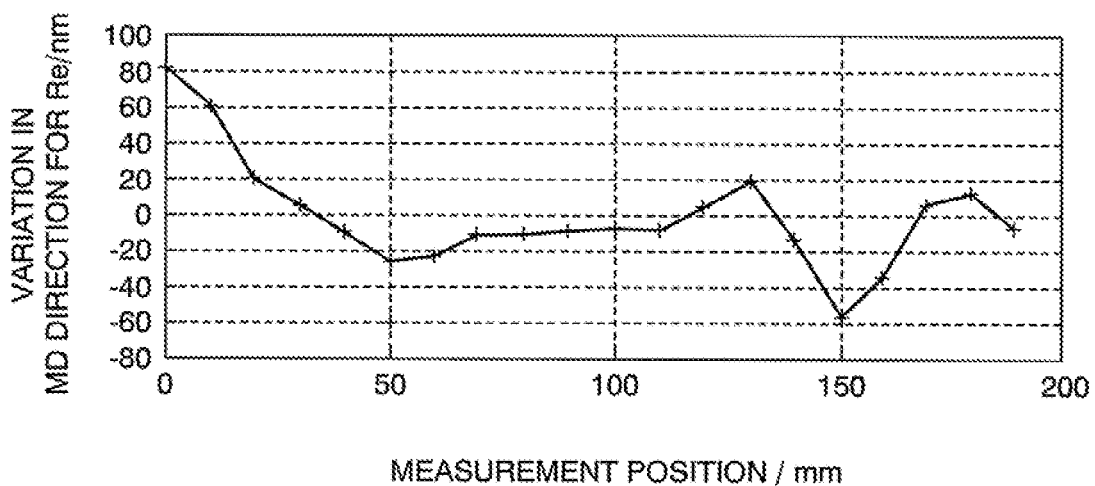
FIG. 7 is a graph showing the results of measurement of a variation in in-plane retardation (machine direction (MD)) of the PET film used in Example 1.

It is known that a TAC film has an in-plane retardation distribution of approximately 1.5 nm, whereas a commercially available polyethylene terephthalate (hereinafter sometimes abbreviated to PET) biaxially stretched film has an in-plane retardation distribution of approximately plus or minus several tens of nanometers. For example, the in-plane retardation distribution in a transverse direction (TD) of the 188 µm-thick biaxially stretched PET film (Lumirror (registered trademark) U35, manufactured by Toray Industries, Inc.) is approximately ±80 nm as shown in FIG. 6, and the in-plane retardation distribution in a machine direction (MD) is about −60 nm to +80 nm as shown in FIG. 7. When the polymer stretched film having the in-plane distribution is used as a λ/2 plate, the influence of the in-plane distribution on the maximum reflection wavelength is 80 nm/275 nm×100=29.1%, for example, in the case where the reflection wavelength λ is in a visible light range (550 nm). In this case, the polarized light incident on the second selectively reflective layer includes a deviated clockwise circularly polarized light component but is not a fully clockwise circularly polarized light. As a result, light $I_R$ to be reflected is reduced, and the reflection efficiency is reduced. On the other hand, even when the in-plane retardation distribution is approximately ±80 nm as described above, the influence of the in-plane distribution on the maximum reflection wavelength is 80 nm/600 nm×100=13.3% in the case where the selected wavelength used is 1200 nm. Accordingly, the quantity of light reflected at the second selectively reflective layer is increased, and a reflecting member having highly efficient and uniform reflecting properties can be realized.

In the present invention, the in-plane retardation distribution of the phase difference layer is preferably ±25 nm or more, more preferably ±50 nm or more. In this case, the in-plane retardation distribution is preferably ±10% or less, more preferably 5% or less, of the average retardation of the whole plane of the phase difference layer. General-purpose stretched films such as polyethylene terephthalate films can be used as the phase difference layer having the in-plane retardation distribution. This can eliminate the need to use an expensive phase difference film.

In the present specification, the average retardation is defined as a value obtained by measuring retardation at 20 points at equal intervals (10 mm) for any 200-mm width of the film and averaging the measured retardation values.

Such polymer stretched films include, for example, stretched films of general-purpose resins, for example, polycarbonate resins; poly(meth)acrylate resins such as polymethylmethacrylates; polystyrene resins such as polystyrenes and styrene copolymers produced by copolymerizing styrene with other monomers; polyacrylonitrile resins; polyester resins such as polyethylene terephthalates, polybutylene terephthalates, and polyethylene naphthalates; polyamide resins such as nylon 6 or nylon 6,6; and polyolefin resins such as polyethylenes and polypropylenes. Among them, stretched films of polyester resins are suitable from the viewpoints of easy availability, production cost, and the level of average retardation. For example, the average retardation of the biaxially stretched film of polyethylene terephthalate is approximately 5000 nm when the film thickness is approximately 200 µm; and is 3000 nm when the film thickness is approximately 120 µm.

Figure 2:
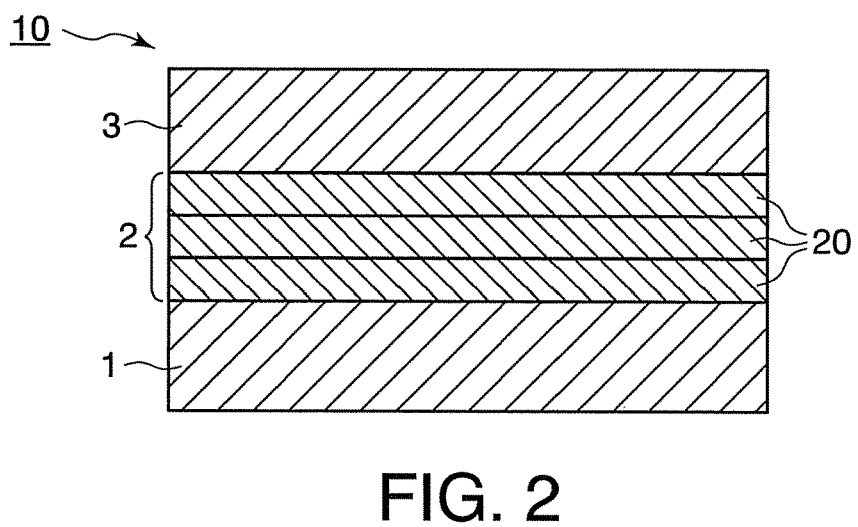
FIG. 2 is a schematic cross-sectional view showing another embodiment of the electromagnetic wave reflecting member according to the present invention.
Figure 3:
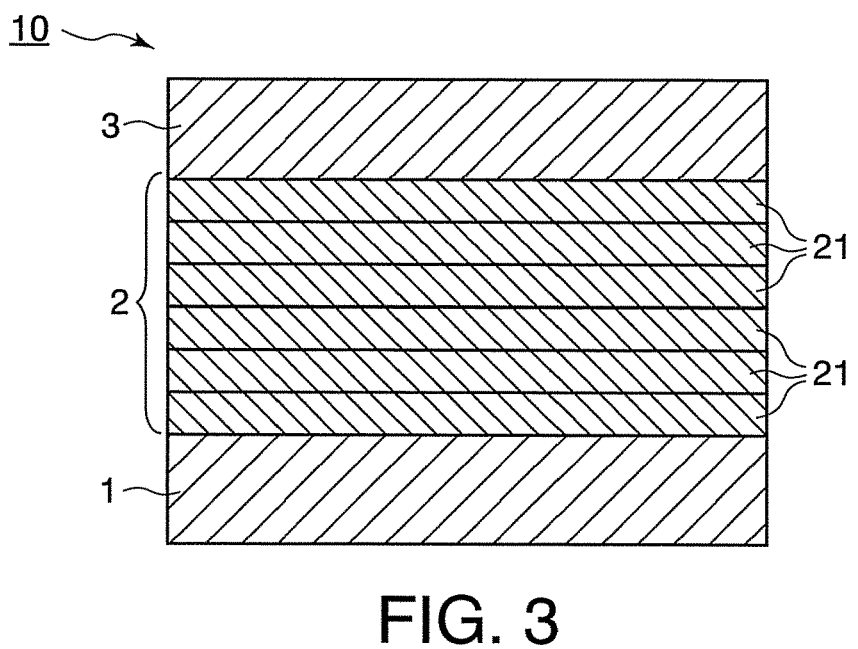
FIG. 3 is a schematic cross-sectional view showing another embodiment of the electromagnetic wave reflecting member according to the present invention.

It is needless to say that, when these polymer stretched films function as a λ/2 plate, as shown in FIG. 2, a plurality of sheets of a polymer stretched film 20 may be superimposed on top of each other while, when these polymer stretched films function as a λ/4 plate, as shown in FIG. 3, a plurality of sheets of a polymer stretched film 21 may be superimposed on top of each other.

<Selectively Reflective Layer>

The selectively reflective layer used in the present invention functions to selectively reflect a counterclockwise circularly polarized light component or a clockwise circularly polarized light component in electromagnetic waves introduced from one side of the selectively reflective layer and to allow the remaining component to pass therethrough. Cholesteric liquid crystal materials are known as the material that can reflect only a specific wavelength. The liquid crystal material having cholesteric regularity selectively reflects one of two circularly polarized lights, i.e., clockwise and counterclockwise circularly polarized lights, in light (electromagnetic waves) introduced along the helical axis of a planar alignment of the liquid crystal. This property is known as circular dichroism, and, when the direction of rotation in the spiral structure of cholesteric liquid crystal molecules is properly selected, the circularly polarized light having an optical rotation identical to the direction of rotation is selectively reflected. In this case, the maximum light scattering of optically rotated polarized light occurs at a selected wavelength λ defined by equation (3):

$$\lambda = n_{av} \times p \qquad (3)$$

In equation (3), $n_{av}$ represents an average refractive index in a plane perpendicular to the helical axis; and p represents a helical pitch in a spiral structure of liquid crystal molecules.

The band width Δλ of the reflection wavelength is represented by equation (4):

$$\Delta\lambda = \Delta n \times p \qquad (4)$$

In formula (4), Δn represents a birefringence of a cholesteric liquid crystal material. That is, the selectively reflective layer formed of a liquid crystal material having cholesteric regularity reflects one of clockwise and counterclockwise circularly polarized light components, in light (electromagnetic waves), that has a wavelength band width Δλ with the selected wavelength λ located at its center and allows the other circularly polarized light component and nonpolarized light in other wavelength range in the light (electromagnetic waves) to pass therethrough.

Light (electromagnetic waves) having a desired wavelength can be reflected by properly selecting $n_{av}$ and p of the cholesteric liquid crystal material. In order to improve the reflectance, a plurality of cholesteric liquid crystal layers prepared using an identical material may be superimposed on top of each other to constitute a selectively reflective layer. In the present invention, the selected reflection wavelength λ is not particularly limited and may be properly determined in a visible light to heat radiation range of 400 nm to 40 µm, preferably 900 to 1400 nm, more preferably 950 to 1350 nm. Selectively reflecting a light component with a wavelength in this range can realize the transmission of a visible light part in sunlight and can reflect only a heat radiation. As described above, even when the in-plan retardation distribution of the phase difference layer is approximately ±50 nm, the deviation from the maximum reflection wavelength can be brought to not more than about 10% at a selected reflection wavelength λ of 900 nm or more. Accordingly, a uniform and highly efficiently electromagnetic wave reflecting member can be realized.

For example, a polymerizable monomer molecule, a polymerizable oligomer molecule, or a liquid crystal polymer may be used as the liquid crystal material having the cholesteric regularity.

Specific examples of liquid crystal compounds having the cholesteric regularity include compounds represented by formulae (1) to (6).

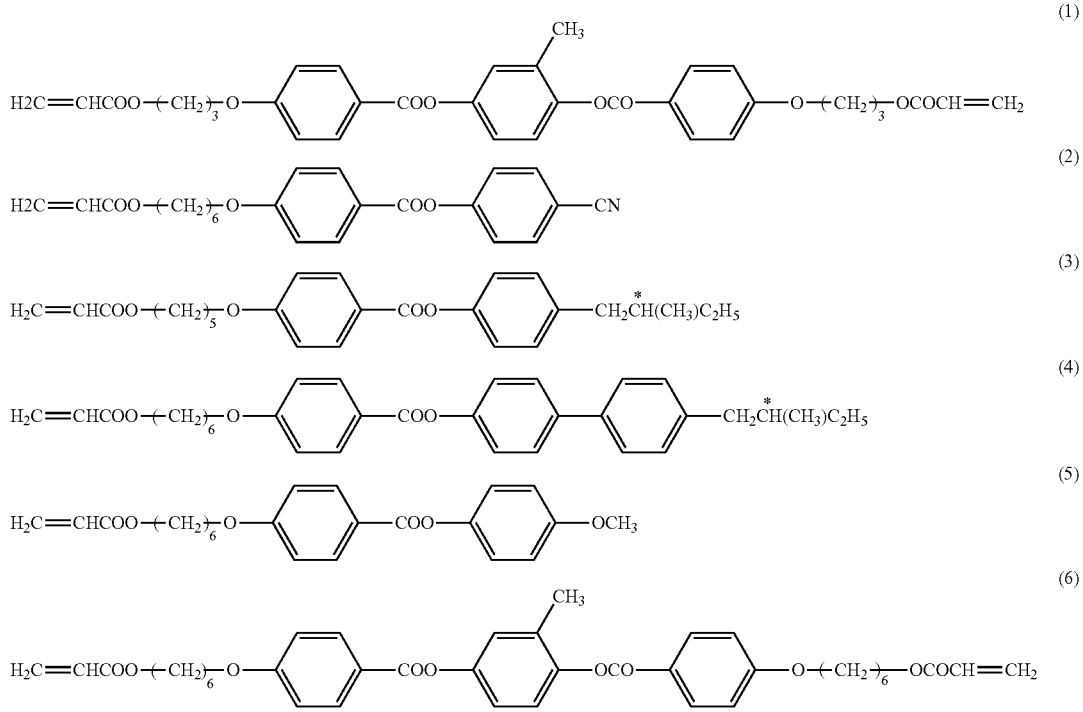

The liquid crystal materials represented by the formulae (1), (2), (5), and (6) can be prepared by processes disclosed in D. J. Broer et al., Makromol. Chem. 190, 3201-3215 (1989) or D. J. Broer et al., Makromol. Chem. 190, 2255-2268(1989) or processes similar to the above processes. The preparation of the liquid crystal materials represented by formulae (3) and (4) are disclosed in DE 195,04,224.

Further, specific examples of nematic liquid crystal materials containing an acrylate group at its end include those represented by chemical formulae (7) to (17):

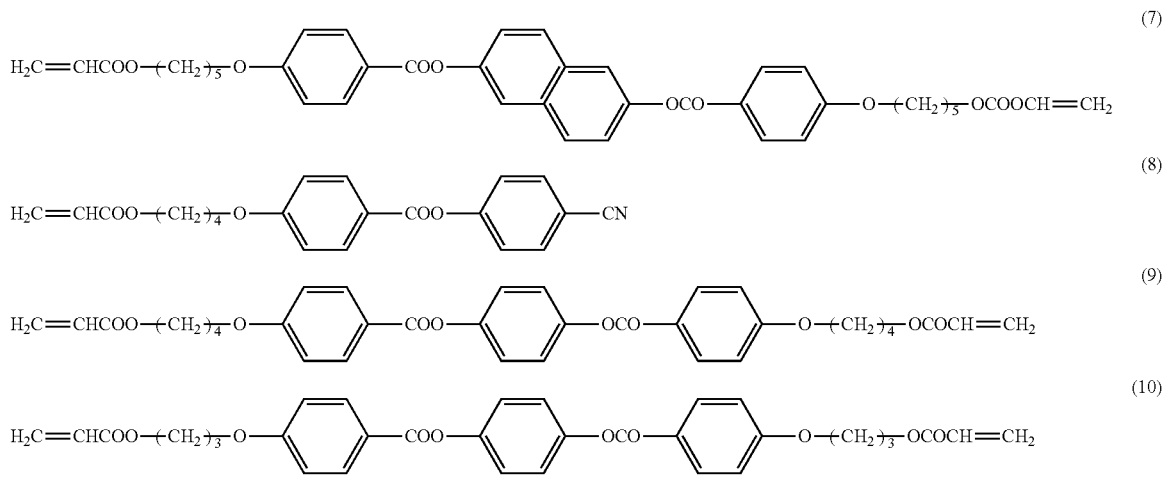

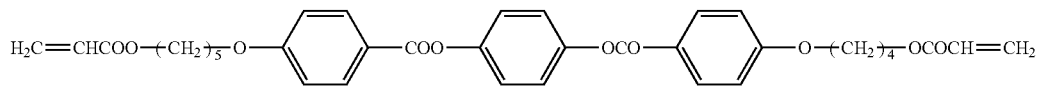
(11)

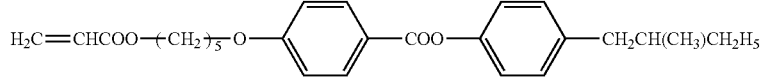
(12)

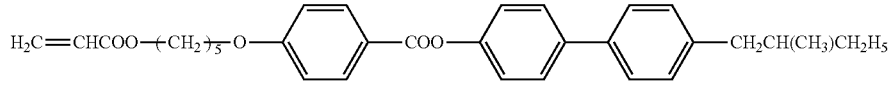
(13)

(14)

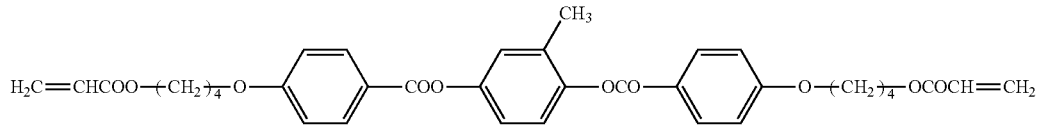
(15)

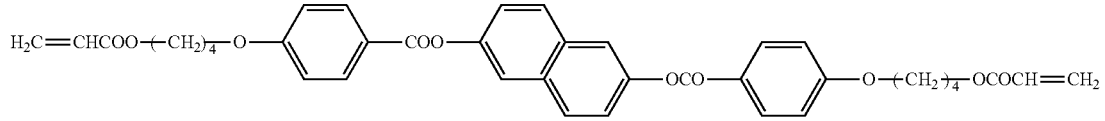
(16)

(17)

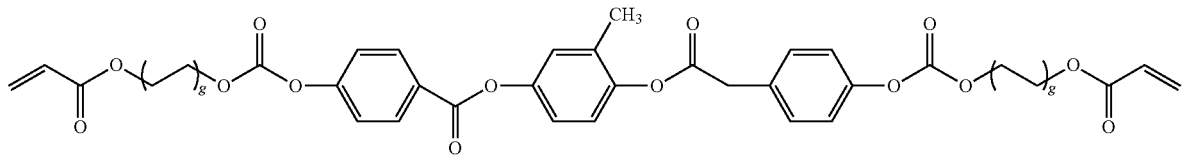

g = an integer of 2 to 5

Further, a compound represented by formula (18) disclosed in SID 06 DIGEST (1673-1676) may also be mentioned as an example thereof.

(18)

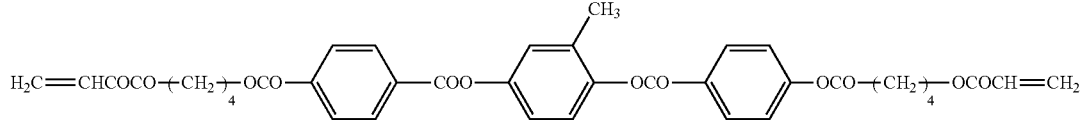

In the present invention, the rod-like compounds may be used either solely or as a mixture of two or more of them. For example, when the rod-like compound is a mixture of a liquid crystal material having one or more polymerizable functional groups at its both ends with a liquid crystal material having one or more polymerizable functional groups at its one end, advantageously the polymerization density (crosslinking density) and optical properties can be regulated as desired by regulating the mixing ratio of these liquid crystal materials.

In the present invention, any of the above rod-like compounds is suitable as the liquid crystal material having cholesteric regularity. Among others, a liquid crystal material using a rod-like compound having nematic crystallinity in combination with a chiral agent is preferred. This is because, in this liquid crystal material, the chiral nematic liquid crystal is immobilized, and, thus, the longitudinal direction of elliptically polarized light after conversion of incident light (electromagnetic waves) to the elliptically polarized light by the selectively reflective layer can easily be regulated as desired.

Any chiral agent which can realize a predetermined cholesteric alignment of the rod-like compound can be used without particular limitation. Chiral agents which are preferred in the present invention include, for example, low-molecular weight compounds having an axial asymmetry in its molecule represented by general formula (19), (20), or (21).

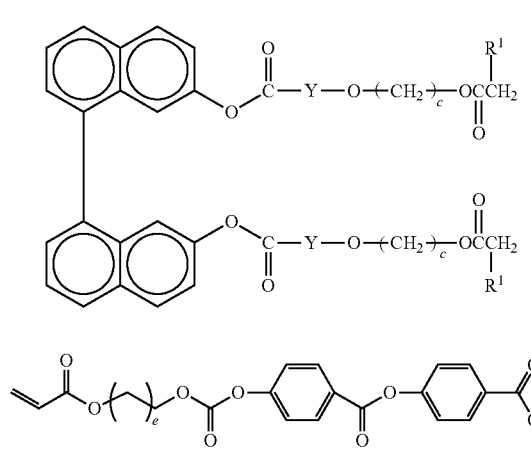
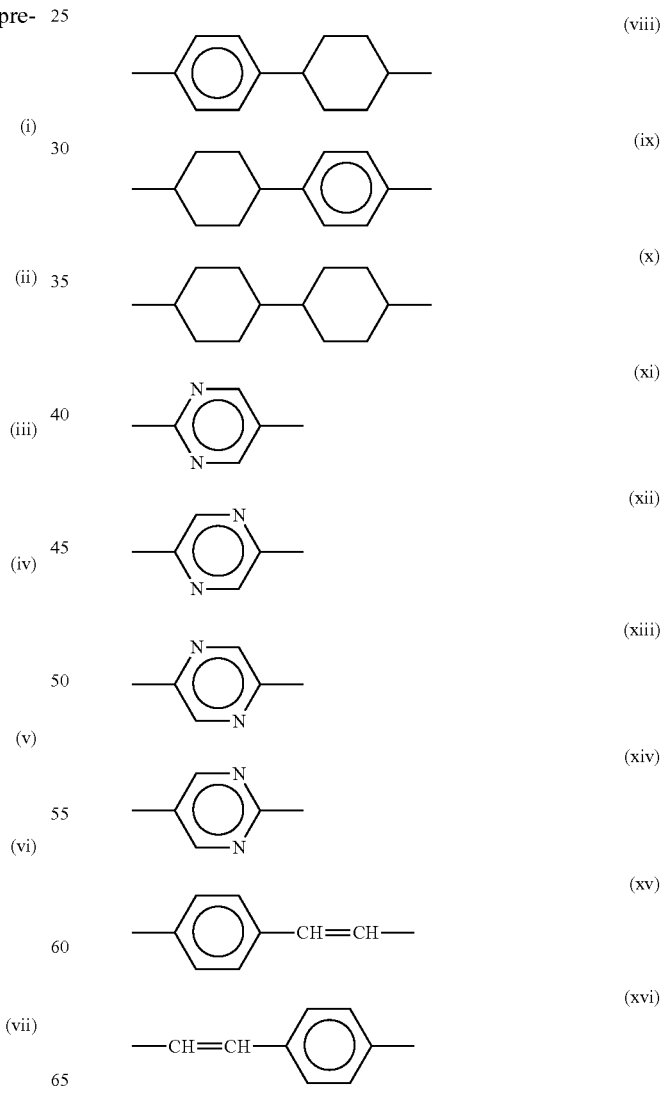
$e$ = an integer of 2 to 5
In general formula (19) or (20), $R_1$ represents hydrogen or a methyl group. Y represents any one of compounds represented by formulae (i) to (xxiv):
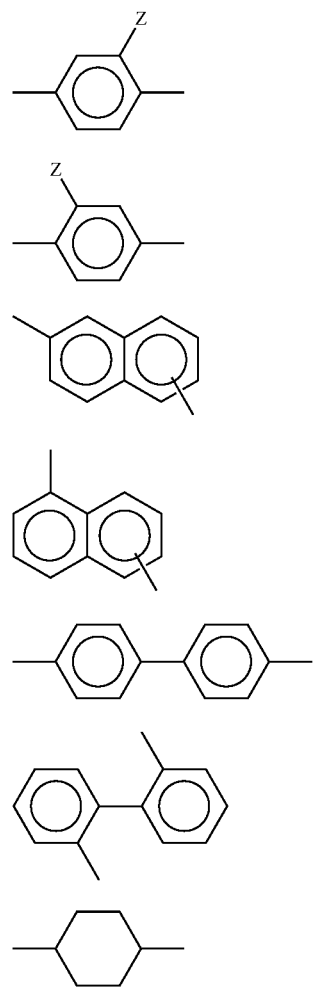

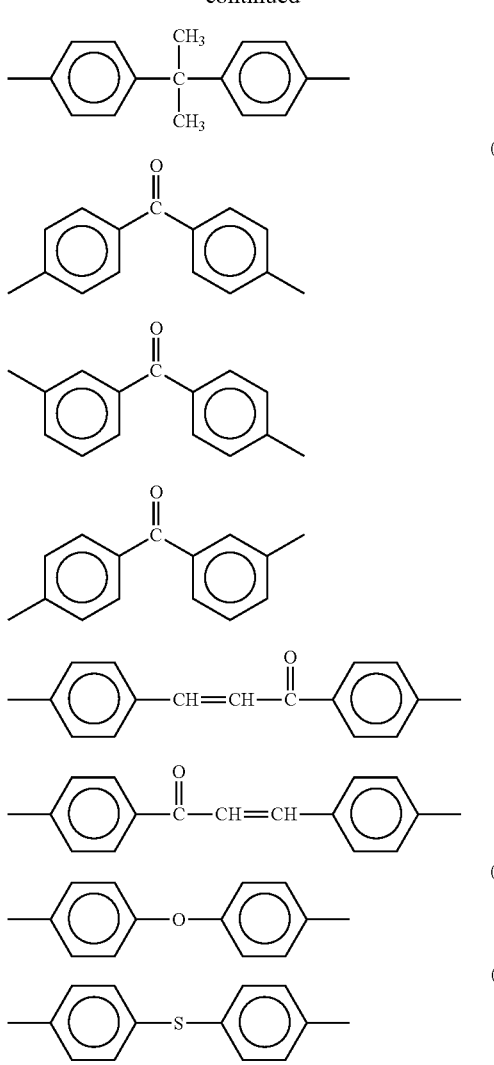

Among them, any one of compounds represented by formulae (i), (ii), (iii), (v), and (vii) is preferred. Further, c and d showing the chain length of the alkylene group each independently may be any integer of 2 to 12, preferably an integer of 4 to 10, more preferably an integer of 6 to 9.

The direction of rotation of the cholesteric alignment of the liquid crystal molecules is not particularly limited. In the present invention, however, in both the first and second selectively reflective layers, the direction of rotation of the cholesteric alignment should be identical. That is, when the first selectively reflective layer reflects only a clockwise circularly polarized light component in the electromagnetic waves, the second selectively reflective layer as well should be one that reflects only the clockwise circularly polarized light component in the electromagnetic waves. Accordingly, the first and second selectively reflective layers are preferably formed of an identical cholesteric liquid crystal material. Further, in the present invention, the use of cholesteric liquid crystal molecules having a clockwise spiral direction is preferred from the viewpoint of easy availability and production cost.

The thickness of the selectively reflective layer is not particularly limited as long as a desired birefringence can be provided depending, for example, upon the type of the compound having cholesteric regularity. In the present invention, the thickness of the selective reflection layer is preferably in the range of 0.1 μm to 100 μm, more preferably in the range of 0.5 μm to 20 μm, still more preferably in the range of 1 μm to 10 μm.

The selectively reflective layer may be formed of only the above compound, or alternatively may have a construction comprising a cholesteric liquid crystal layer provided on any desired substrate. In this case, any substrate which does not inhibit birefringent properties of the cholesteric liquid crystal layer and is transparent can be used without particular limitation. For example, either a flexible material or a nonflexible rigid material may be used. Among others, the use of the flexible material is preferred in the present invention.

<Other Layer>

Figure 4:
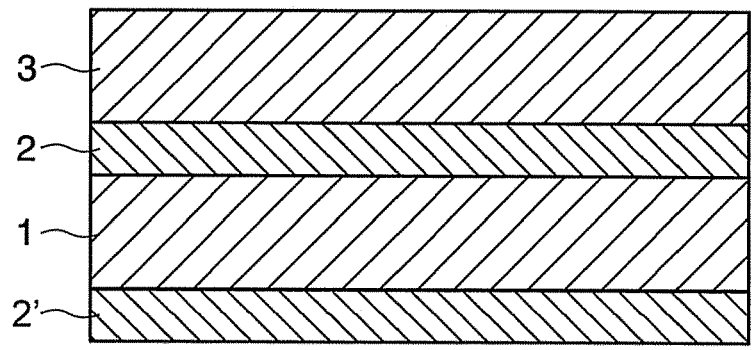
FIG. 4 is a schematic cross-sectional view showing another embodiment of an electromagnetic wave reflecting member according to the present invention.

The first and second selectively reflective layers may be formed by applying a cholesteric liquid crystal material on both sides of the phase difference layer as the base material. An adhesive layer may be interposed between each of the layers and the phase difference layer. Adhesives suitable for the adhesive layer include, for example, hydrophilic adhesives such as polyvinyl alcohols and polyvinyl pyrrolidones, acrylic pressure sensitive adhesives, urethane pressure sensitive adhesives, and epoxy pressure sensitive adhesives. However, any pressure sensitive adhesive which is transparent to a desired wavelength may be used as the adhesive layer without particular limitation. Further, a construction as shown in FIG. 4 may be adopted in which an assembly comprising a selectively reflective layer 1 provided on a phase difference layer 2' and an assembly comprising a selectively reflective layer 3 provided on a phase difference layer 2 are stacked on top of each other so that the selectively reflective layer 1 and the phase difference layer 2 face each other. In this construction, the electromagnetic wave reflecting member can be formed by performing the step of forming a selectively reflective layer by coating and the step of bonding each of the layers each once. Accordingly, the electromagnetic wave reflecting member can be provided in a simpler and more cost-effective manner. When light is incident on the phase difference layer 2' side provided on the lower part of the selectively reflective layer 1, since the incident light is nonpolarized light, the electromagnetic wave reflecting member having the construction shown in FIG. 4 has quite the same optical function as that of the electromagnetic wave reflecting member having the construction shown in FIG. 1.

<Electromagnetic Wave Reflecting Member>

The electromagnetic wave reflecting members according to the present invention as described above can be used as a light reflecting plate or a heat radiation reflecting plate that reflects a light component with a specific wavelength by properly selecting the selected reflection wavelength λ of the cholesteric liquid crystal material depending upon the application of the electromagnetic wave reflecting member. For example, an electromagnetic wave reflecting member, of which λ has been selected so as to reflect a component falling within a near-infrared light to heat radiation wavelength range, held between two sheets of glass can be used as a heat radiation reflecting glass for automobiles. Also in this case, the use of the electromagnetic wave reflecting member according to the present invention can realize the production of a heat radiation reflecting glass having both uniform reflecting properties and highly efficient reflecting properties over the whole glass surface at low cost.

EXAMPLES

Example 1

<Provision of Phase Difference Layer>

A biaxially stretched film of polyethylene terephthalate (Lumirror (registered trademark) U35, manufactured by Toray Industries, Inc.) was provided as a phase difference layer. The thickness of the film was 188 μm. The average retardation was measured with KOBRA-WX100/IR manufactured by Oji Scientific Instruments (measuring angle 0 degree, wavelength 1200 nm) and was found to be about 4083 nm. Accordingly, the biaxially stretched film satisfied formula (1) wherein n=3. Further, the in-plane distribution of the retardation in a transverse direction (TD) of the biaxially stretched film and the in-plane distribution of the retardation in a machine direction (MD) of the biaxially stretched film were as shown in FIGS. 6 and 7.

<Provision of Selectively Reflective Layer>

A solution of 97.2 parts of liquid crystalline monomer molecules (Paliocolor (registered trademark) LC1057, manufactured by BASF) containing a polymerizable acrylate at both ends thereof and having a spacer between a mesogen located at the center part of the molecule and the acrylate and 2.8 parts of chiral agent molecules containing a polymerizable acrylate at both ends thereof (Paliocolor (registered trademark) LC756, manufactured by BASF)) dissolved in cyclohexanone (i.e., a cyclohexanone solution) was provided. 2.5% by weight, based on the liquid crystalline monomer molecules, of a photopolymerization initiator (Irgacure 184) was added to the cyclohexanone (solid content: 40% by weight). In this case, "parts" are by weight.

On the other hand, the cyclohexanone solution was coated with a bar coater onto the biaxially stretched film without interposing an aligning film to form a coating film. Subsequently, the assembly was held at 120° C. for 2 min to evaporate cyclohexanone in the coating film and to align liquid crystalline monomer molecules. The coating film was irradiated with ultraviolet light at 400 mJ/cm$^2$, whereby the acrylate in the liquid crystalline monomer molecules aligned by radicals generated from the photoinitiator contained in the coating film and the acrylate in the chiral agent molecules are cross-linked three-dimensionally to produce a polymer and to immobilize a cholesteric structure on the film. Thus, a selectively reflective layer was formed. In this case, the selectively reflective layer had a thickness of 5 μm. The selected reflection wavelength band was measured with a spectrophotometer (UV-3100PC manufactured by SHIMADZU CORPORATION) and was found to be 1120 nm.

Figure 8:
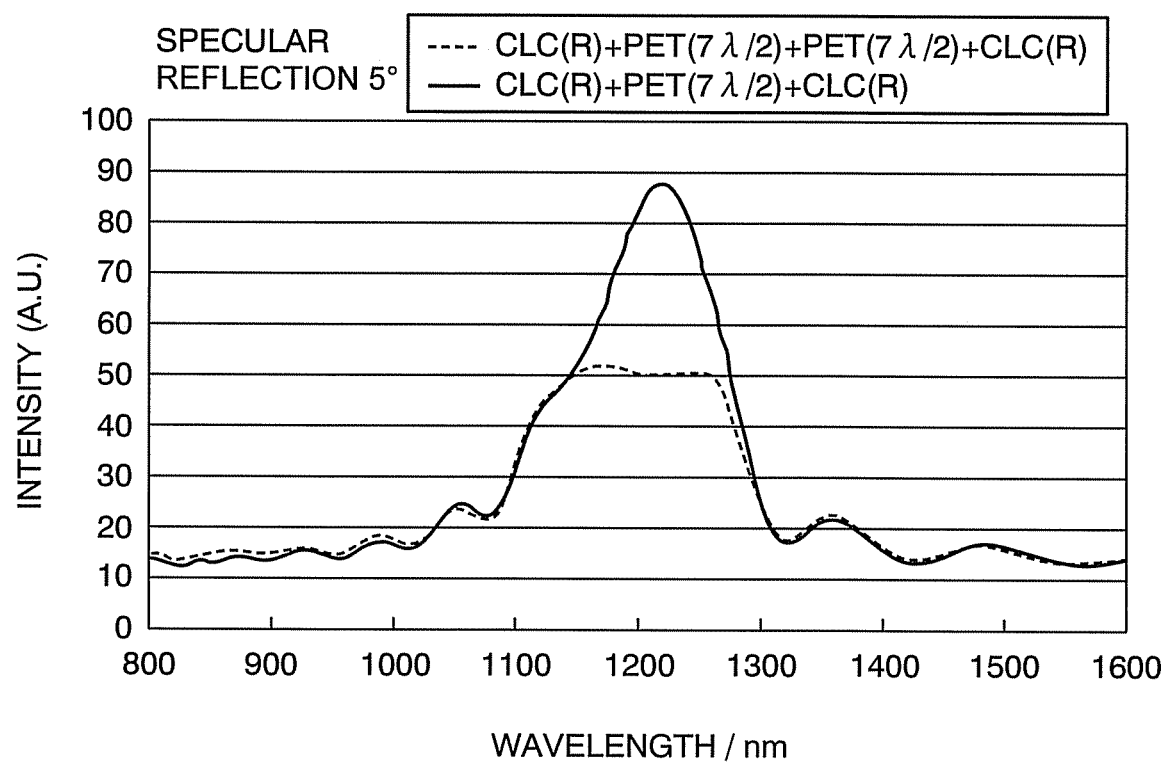
FIG. 8 is a graph showing the results of measurement of the reflectance of the electromagnetic wave reflecting member manufactured in Example 1 (solid line) and the electromagnetic wave reflecting member manufactured in Comparative Example 1 (dashed line)

An electromagnetic wave reflecting member was prepared by stacking two sheets of the selectively reflective layer on top of each other through the phase difference layer. The reflecting properties of the electromagnetic wave reflecting member were measured at a regular reflection angle of 5 degrees with a spectrophotometer and were as shown in FIG. 8 (a solid line).

Example 2

The biaxially stretched film as used in Example 1 was used as a phase difference layer. A selectively reflective layer was formed on one side of the biaxially stretched film in the same manner as in Example 1. Subsequently, the selectively reflective layer was also formed on the other side of the biaxially stretched film in the same manner as described just above to prepare an electromagnetic wave reflecting member. The reflecting properties of the electromagnetic wave reflecting member were measured at a regular reflection angle of 5 degrees with a spectrophotometer and were found to be the same as those shown in FIG. 8 (a solid line).

Example 3

Figure 9:
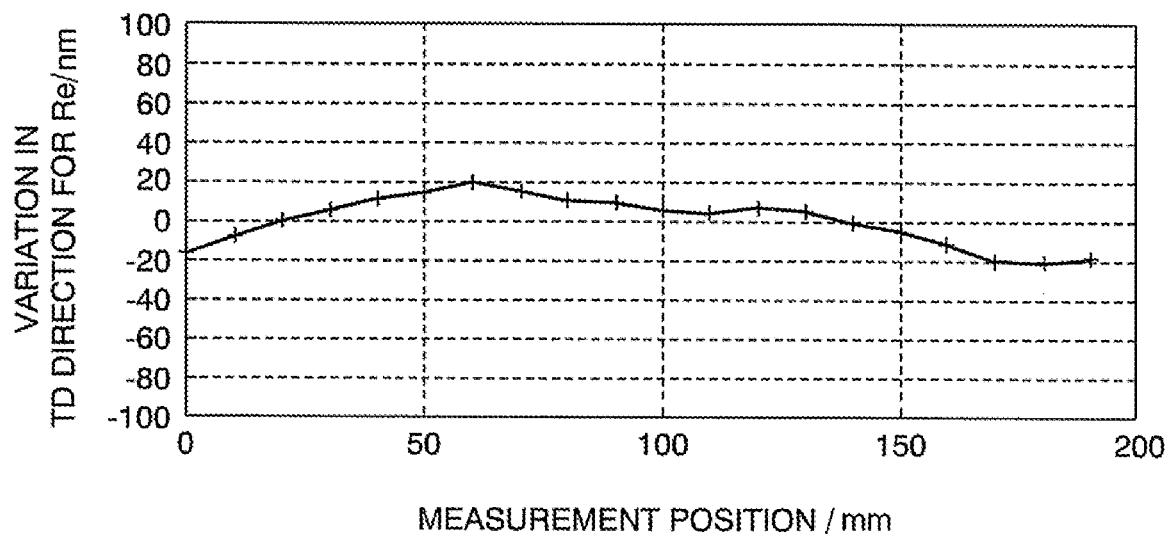
FIG. 9 is a graph showing the results of measurement of a variation in in-plane retardation (TD) of the PET film used in Example 3.
Figure 10:
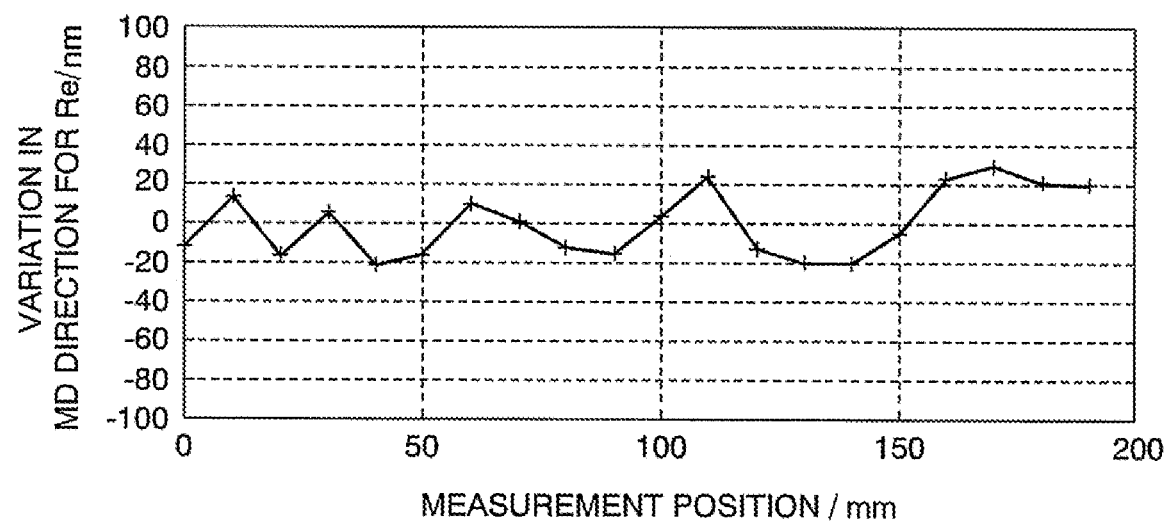
FIG. 10 is a graph showing the results of measurement of a variation in in-plane retardation (MD) of the PET film used in Example 3.

A biaxially stretched film of polyethylene terephthalate (Lumirror (registered trademark) T60, manufactured by Toray Industries, Inc.) was used, instead of the biaxially stretched film used in Example 1, as a phase difference layer. The thickness of the film was 38 μm. The average retardation was measured with KOBRA-WX100/IR manufactured by Oji Scientific Instruments (measuring angle 0 degree, wavelength 1200 nm) and was found to be about 1944 nm. Accordingly, the biaxially stretched film satisfied formula (1) wherein n=1. Further, the in-plane distribution of the retardation in a transverse direction (TD) of the biaxially stretched film and the in-plane distribution of the retardation in a machine direction (MD) of the biaxially stretched film were as shown in FIGS. 9 and 10.

Figure 11:
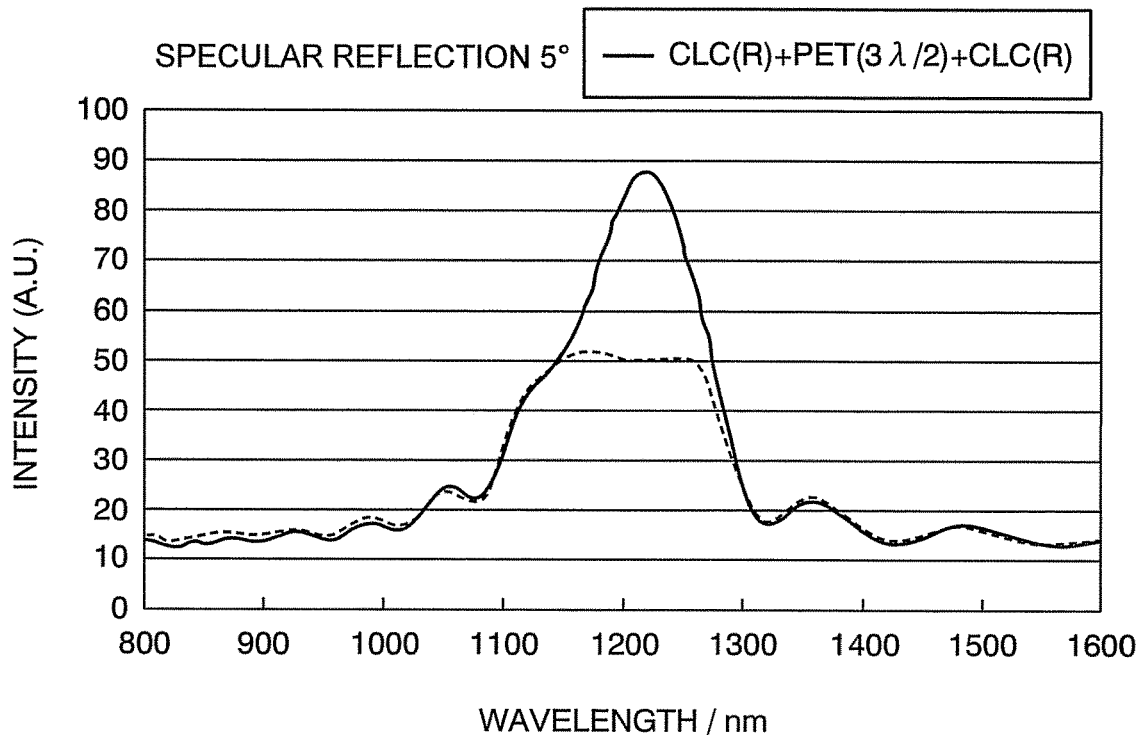
FIG. 11 is a graph showing the results of measurement of the reflectance of the electromagnetic reflecting member manufactured in Example 3.

An electromagnetic wave reflecting member was prepared by forming a selectively reflective layer on both sides of the biaxially stretched film in the same manner as in Example 2. The reflecting properties of the electromagnetic wave reflecting member were measured at a regular reflection angle of 5 degrees with a spectrophotometer and were as shown in FIG. 11.

Example 4

A biaxially stretched film as used in Example 1 was used as a phase difference layer, and a selectively reflective layer was formed on one side of the biaxially stretched film in the same manner as in Example 1. Quite the same member as the member thus prepared by providing the selectively reflective layer on the biaxially stretched film was prepared. An electromagnetic wave reflecting member having a layer construction as shown in FIG. 4 was prepared by stacking both the members on top of each other so that the biaxially stretched film in one of the members faced the selectively reflective layer in the other member. The reflecting properties of the electromagnetic wave reflecting member were measured at a regular reflection angle of 5 degrees with a spectrophotometer and were found to be the same as those shown in FIG. 8 (a solid line).

Comparative Example 1

An electromagnetic wave reflecting member was prepared in the same manner as in Example 1, except that two sheets of the biaxially stretched films as used in Example 1 were superimposed on top of each other. As a result of the superimposition of the two sheets of the biaxially stretched film on top of each other, the average retardation of the phase difference layer was about 8160 nm. This retardation means n=6.5 in formula (1) and thus does not satisfy formula (1). The reflecting properties of the electromagnetic wave reflecting member thus obtained were measured in the same manner as in Example 1 and were found to be as shown in FIG. 8 (a dashed line).

Comparative Example 2

Figure 12:
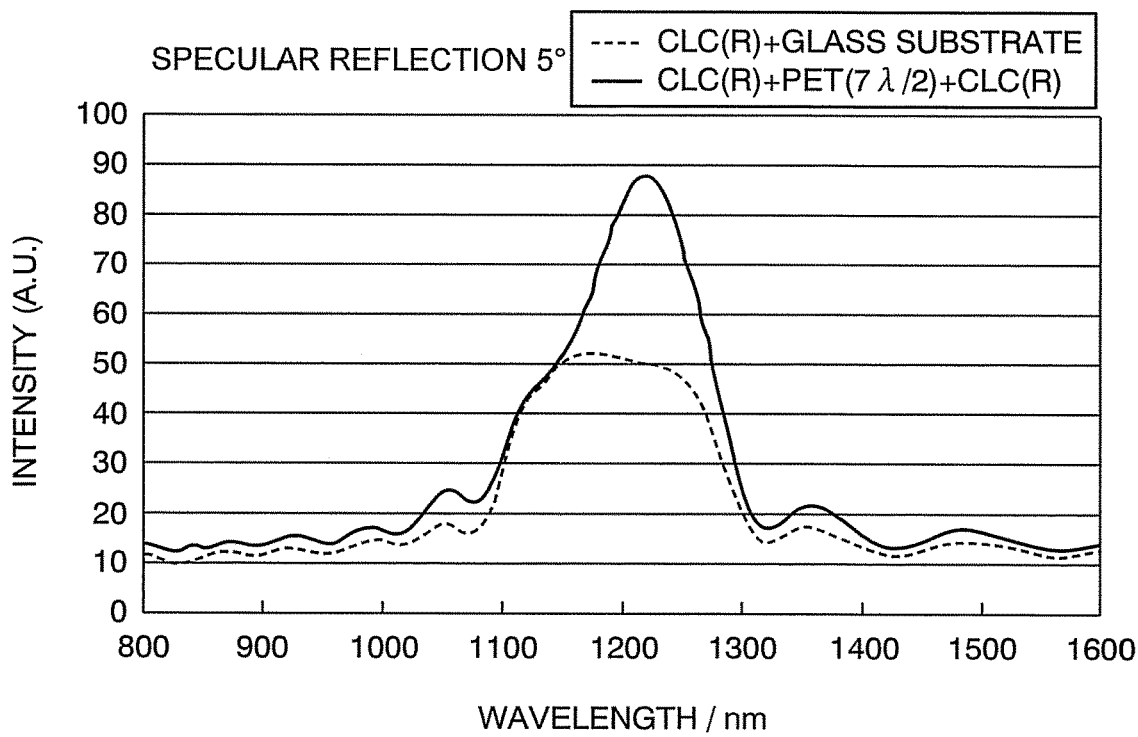
FIG. 12 is a graph showing the results of measurement of the reflectance of the electromagnetic wave reflecting member manufactured in Example 1 (solid line) and the electromagnetic wave reflecting member manufactured in Comparative Example 2 (dashed line)
Figure 13:
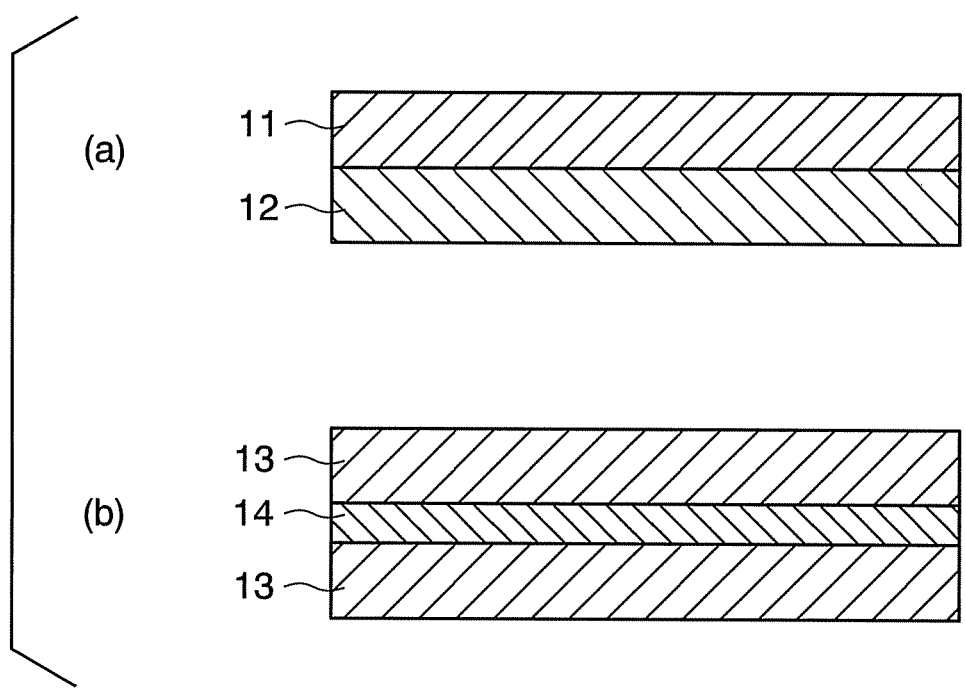
FIG. 13 is a schematic cross-sectional view showing one embodiment of the conventional reflecting member.

An electromagnetic wave reflecting member was prepared in the same manner as in Example 1, except that glass (retardation 0) was used instead of the biaxially stretched film used in Example 1. The reflecting properties of the electromagnetic wave reflecting member thus obtained were measured in the same manner as in Example 1 and were found to be as shown in FIG. 12 (a dashed line). The solid line in FIG. 12 shows reflecting properties of the electromagnetic wave reflecting member in Example 1.

As can be seen from the results shown in FIGS. 8 to 12, the use of the electromagnetic wave reflecting member according to the present invention can realize uniform and highly efficient in-plane reflecting properties even when an inexpensive general-purpose film such as a biaxially stretched film of polyethylene terephthalate is used as a phase difference layer.

What is claimed is:

1. A method for producing an electromagnetic wave reflecting member comprising: applying a cholesteric liquid crystal material on a first phase difference layer having an average retardation satisfying the following equation:

$$Re=\{(2n+1)/2\pm0.2\}\times\lambda$$

wherein Re represents retardation; $\lambda$ represents wavelength; and n is an integer of 1 or more, to form a first selectively reflective layer, applying a cholesteric liquid crystal material on a second phase difference layer having an average retardation satisfying the following equation:

$$Re=\{(2n+1)/2\pm0.2\}\times\lambda$$

wherein Re represents retardation; $\lambda$ represents wavelength; and n is an integer of 1 or more, to form a second selectively reflective layer, stacking an assembly comprising the first selectively reflective layer provided on the first phase difference layer and an assembly comprising the second selectively reflective layer provided on the second phase difference layer on top of each other so that the first selectively reflective layer and the second phase difference layer are adjacent to each assembly;

wherein the first selectively reflective layer reflects only a clockwise circularly polarized light component with wavelength $\lambda$ in incident electromagnetic waves, and the second selectively reflective layer reflects only a clockwise circularly polarized light component with said wavelength $\lambda$.

* * * * *